United States Patent [19]

Kinami et al.

[11] Patent Number: 5,326,816
[45] Date of Patent: Jul. 5, 1994

[54] ROOM TEMPERATURE CURABLE SILICONE COMPOSITION

[75] Inventors: Hitoshi Kinami; Shinichi Sato; Hirokazu Yamada; Toshio Takago, all of Annaka, Japan

[73] Assignee: Shin-Etsu Chemical Co., Ltd., Tokyo, Japan

[21] Appl. No.: 893,016

[22] Filed: Jun. 3, 1992

[30] Foreign Application Priority Data

Jun. 3, 1991 [JP] Japan .................. 3-159976

[51] Int. Cl.$^5$ .............................. C08K 5/16
[52] U.S. Cl. ................... 524/718; 524/720; 524/728; 524/772; 524/775; 524/863; 528/35
[58] Field of Search ............ 528/35; 524/863, 720, 524/728, 718, 772, 775

[56] References Cited

U.S. PATENT DOCUMENTS

| | | | |
|---|---|---|---|
| 4,436,851 | 3/1984 | Vaughn, Jr. ...................... | 524/588 |
| 4,667,007 | 5/1987 | Wengrovius et al. .............. | 524/588 |
| 4,683,251 | 7/1987 | Mikami ............................... | 524/588 |
| 4,888,380 | 12/1989 | Kamis et al. ....................... | 528/35 |
| 4,888,404 | 12/1989 | Klosowski et al. ................ | 528/35 |
| 4,898,910 | 2/1990 | Kamis et al. ....................... | 528/35 |
| 5,006,584 | 4/1991 | Davis ................................... | 528/35 |
| 5,093,389 | 3/1992 | Shimizu ............................. | 524/588 |
| 5,177,131 | 1/1993 | Takago et al. ..................... | 524/100 |

Primary Examiner—Melvyn I. Marquis
Assistant Examiner—Karen A. Dean
Attorney, Agent, or Firm—Oblon, Spivak, McClelland, Maier & Neustadt

[57] ABSTRACT

A room temperature curable silicone composition comprising (A) an organopolysilethylenesiloxane represented by the following general formula (1):

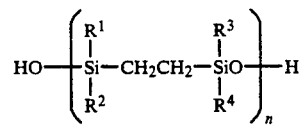

wherein $R^1$ to $R^4$ each represent a monovalent hydrocarbon group having 1 to 10 carbon atoms, and n is an integer of 10 or over, (B) an organosilane or an organosiloxane having at least two hydrolyzable groups in the molecule, and (C) at least one ultraviolet absorbing agent and antioxidant. The cured product formed from this composition exhibits good soil resistance for a long period of time and soiling of the surface of the cured product and its surroundings due to dust or the like in the air can be obviated effectively.

6 Claims, No Drawings

ROOM TEMPERATURE CURABLE SILICONE COMPOSITION

BACKGROUND OF THE INVENTION

1. Field of the Invention

The present invention relates to a room temperature curable silicone composition readily curable by the action of moisture, and more particularly to a room temperature curable silicone composition useful as a sealing material or a coating material in the field of construction.

2. Description of the Prior Art

Hitherto, room temperature curable organopolysiloxane compositions are known that can stably be stored in a fluid state in a closed system and can be cured in the atmosphere at room temperature with moisture in the air into a rubberlike elastic product. These compositions are used, for example, as sealing materials, coating materials, and adhesives widely in the fields, for example, of construction industry, engineering industry, and electric industry.

If the above room temperature organopolysiloxane composition is used as a sealing material or a coating material, there is a defect that nonfunctional siloxanes or the remaining unreacted siloxane bleeds from the cured product onto the surface and dust or the like in the air adheres thereto, so that the surface and the surroundings are soiled thereby impairing the fine appearance of buildings and the like. To solve the problem of this soiling, various additives are studied and, for example, methods wherein a polyoxyethylene surface active agent or a surface active agent having a sorbitan residual group or a disaccharide residual group is added (see Japanese Pre-examination Patent Publication (kokai) Nos. 56-76452 (1981) and 56-76453 (1981)) and methods wherein a surface active agent having at least one fluorine atom in the molecule is used in combination with an organosilicon compound having an amino group (see Japanese Pre-examination Patent Publication (kokai) No. 61-34062 (1986)) are suggested.

However, although these methods are effective for the prevention of soiling for a short period of time, the effect for prevention of soiling does not last and therefore it is impossible to prevent soiling for a long period of time.

SUMMARY OF THE INVENTION

Therefore, an object of the present invention is to provide a curable silicone composition which yields a cured product that retains the soil resistance for a long period of time and keeps the surface and the surroundings from being soiled.

According to the present invention, there is provided a room temperature curable silicone composition comprising (A) an organopolysilethylenesiloxane represented by the following general formula (1):

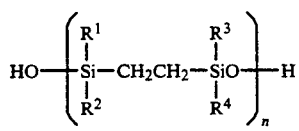

(1)

wherein $R^1$, $R^2$, $R^3$, and $R^4$, which may be the same or different, each represent a substituted or unsubstituted monovalent hydrocarbon group having 1 to 10 carbon atoms, and n is an integer of 10 or more, (B) an organosilicon compound having two or more hydrolyzable groups in the molecule, and (C) one or more compounds selected from the group consisting of ultraviolet absorbing agents and antioxidants.

DETAILED DESCRIPTION OF PREFERRED EMBODIMENTS

(A) Organopolysilethylenesiloxanes

In the present invention, the organopolysilethylenesiloxane represented by the above general formula (1) is used as a base polymer and is quite important for forming a cured product which retains good soil resistance for a long period of time. For instance, as in the case of conventional known silicone compositions, if an organopolysiloxane having a structure wherein silicon atoms are linked in sequence through oxygen atoms is used as a base polymer, it is difficult to form a cured product good in soil resistance like the above case.

In the present invention, the reason why a cured product which retains good soil resistance for a long period of time can be formed by using said organopolysilethylenesiloxane as a base polymer is not precisely clear, it is considered that, due to the molecular skeleton of the base polymer wherein silicon atoms are linked in sequence through ethylene groups, the obtained cured product itself is excellent in compatibility with nonfunctional siloxanes and the uncured base polymer, thus as a result bleeding of these nonfunctional siloxanes and the like from the cured product is obviated and therefore the cured product exhibits good soil resistance for a long period of time.

In the general formula (I), groups $R^1$ to $R^4$ each represent an unsubstituted or substituted monovalent hydrocarbon group having 1 to 10 carbon atoms, preferably 1 to 8 carbon atoms. Specific examples include an alkyl group such as a methyl group, an ethyl group, a propyl group, and a butyl group, a cycloalkyl group such as a cyclohexyl group, an alkenyl group such as a vinyl group, an allyl group, a propenyl group, and a butenyl group, an aryl group such as a phenyl group, a tolyl group, and a naphthyl group, an aralkyl group such as a benzyl group and a 2-phenylethyl group, and corresponding monovalent substituted hydrocarbon groups in which part or all of the hydrogen atoms of the above monovalent hydrocarbon groups have been replaced with a halogen atom(s), a cyano group(s) or the like such as a 2-cyanoethyl group, a 3,3,3-trifluoropropyl group, a 6,6,6,5,5,4,4,3,3-nonafluorohexyl group, a chloromethyl Group, and a 3-chloropropyl Group. Groups $R^1$ to $R^4$ may be identical to each other or different from each other.

In the general formula (I), n is an integer of 10 or over, generally an integer of 10 to 5,000, and preferably an integer of 10 to 1,000. In association with such a value of n, the organopolysilethylenesiloxane used in the present invention has a viscosity at 25° C. in the range of 25 to 1,000,000 cSt, preferably 1,000 to 100,000 cSt.

Specific examples of the organopolysilethylenesiloxane preferably used in the present invention include

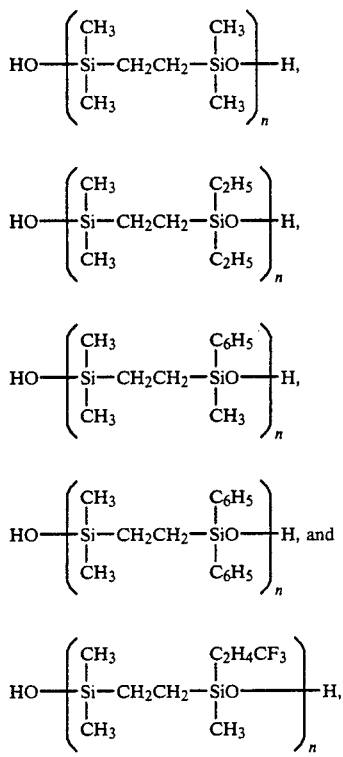

wherein in the formulas n is an integer of 10 to 5,000.

(B) Organosilicon compounds

The organosilicon compound which is the component (B) has at least two hydrolyzable groups in the molecule. The hydrolyzable groups undergo a crosslinking reaction with the hydroxyl groups at the both ends of the molecular chain of the above component (A). Examples of such a hydrolyzable group include an alkoxy group such as a methoxy group, an ethoxy group, a propoxy group, a butoxy group, a methoxyethoxy group, and an ethoxyethoxy group; an acyloxy group such as an acetoxy group, a propionoxy group, and a butyloxy group; an alkenyloxy group such as a propenyloxy group and an isobutenyloxy group; an iminoxy group such as a dimethylketooxime group, a methylethylketooxime group, a diethylketooxime group, a cyclopentanoxime group, and a cyclohexanoxime group; an amino group such as an N-methylamino group, an N-ethylamino group, an N-propylamino group, an N-butylamino group, an N,N-dimethylamino group, and an N,N-diethylamino group; an amido group such as an N-methylacetoamido group and an N-ethylacetoamido group; and an aminooxy group such as an N,N-dimethylaminooxy group and an N,N-diethylaminooxy group.

Besides the hydrolyzable groups, substituents bonded to the silicon atoms include those unsubstituted or substituted monovalent hydrocarbon groups having 1 to 10 carbon atoms exemplified regarding $R^1$ to $R^4$.

The organosilicon compound which is the component (B) specifically includes an alkoxysilane such as methyltrimethoxysilane, vinyltriethoxysilane, phenyltrimethoxysilane, 3,3,3-trifluoropropyltrimethoxysilane, tetramethoxysilane, and tetraethoxysilane, and partially hydrolyzed products of these; a trioximosilane such as methyltris(methylethylketooximo)silane, and vinyltris(methylethylketooximo)silane; an acetoxysilane such as methyltriacetoxysilane, ethyltriacetoxysilane, phenyltriacetoxysilane, 6,6,6,5,5,4,4,3,3-nonafluorohexyltriacetoxysilane, and tetraacetoxysilane; an isopropenoxysilane such as methyltriisopropenoxysilane, vinyltriisopropenoxysilane, phenyltriisopropenoxysilane, 6,6,6,5,5,4,4,3,3-nonafluorohexyltriisopropenoxysilane, and tetraisopropenoxysilane; a triaminosilane such as methyltris(diethylamino)silane, and vinyltris(dicyclohexylamino)silane; an amidosilane such as methyltriethylacetoamidosilane, phenyltrimethylacetoamidosilane, and vinyldiethylacetoamidosilane; a trifluoroethoxysilane such as methyltris(2,2,2-trifluoroethoxy)silane, vinyltris(2,2,2-trifluoroethoxy)silane, and tetrakis(2,2,2-trifluoroethoxy)silane; and an aminoxysiloxane such as 1,3,5,7-tetramethyl-1,3-dipropyl-5,7-bis(diethylaminoxy)cyclotetrasiloxane, and 1,3,5,7-tetramethyl-1-propyl-3,5,7-tris(diethylaminoxy)-cyclotetrasiloxane. Among these, vinyltriethoxysilane and tetraethoxysilane and partially hydrolyzed products of these, methyl tris (methylethylketooxime) silane, methyltriacetoxysilane, vinyltriisopropenoxysilane, and 1,3,5,7- tetramethyl- 1- propyl- 3,5,7-tris(diethylaminoxy)cyclotetrasiloxane are preferred. These may be used singly or as a mixture of two or more.

The amount of the organosilicon compound to be blended which is the component (B) is 1 to 25 parts, preferably 2 to 10 parts by weight, per 100 parts by weight of the organopolysilethylenesiloxane which is the component (A). If the amount to be blended is too small, the composition is liable to form a gel or in some cases the rubber strength of the cured product obtained from the composition becomes weak or the hardness of the cured product lowers. On the other hand, if the amount to be blended is excessive, the degree of shrinkage at the time of curing of the composition becomes large and the elasticity is inclined to lower.

(C) Ultraviolet absorbing agents/antioxidants

The component (C) comprises one or more compounds selected from the group consisting of ultraviolet absorbing agents and antioxidants and serves to prevent the obtained cured product from being deteriorated by ultraviolet light or oxidation. Preferably the component (C) comprises an ultraviolet absorbing agent.

That is, the curable composition containing the components (A) and (B) has an advantage that the composition can form a cured product good in soil resistance, but the composition is unsatisfactory in that the surface of the cured product obtained from it is liable to deteriorate, for instance, the smoothness of the surface of the cured product is easily impaired. According to the present invention, the addition of at least one of ultraviolet absorbing agents and antioxidants can also obviate such a problem of deterioration of the surface of the cured product.

In the present invention, as the ultraviolet absorbing agent, ultraviolet absorbing agents known per se can be used and, for example, use can be made of benzotriazole ultraviolet absorbing agents such as

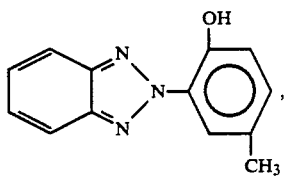

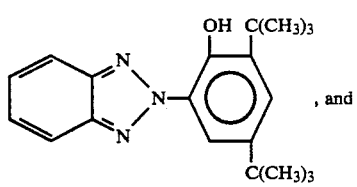

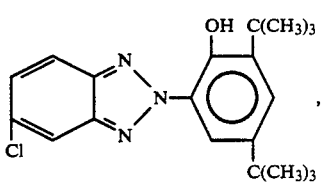

anilide ultraviolet absorbing agents such as

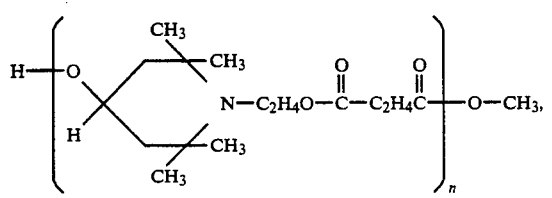

and

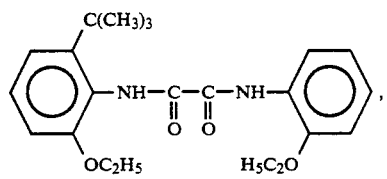

hindered amine type ultraviolet absorbing agents such as

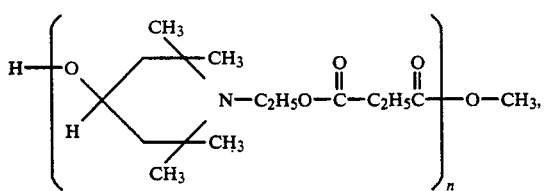

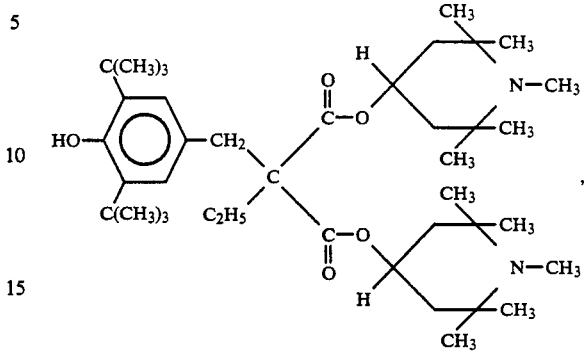

benzophenone ultraviolet absorbing agents such as

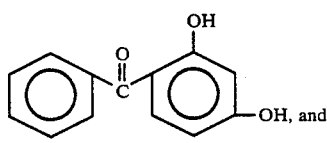

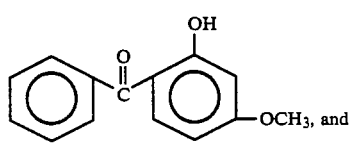

aryl ester ultraviolet absorbing agents such as

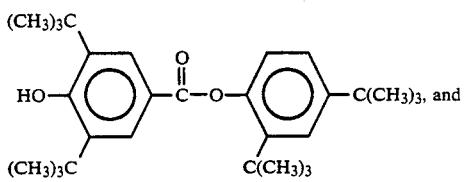

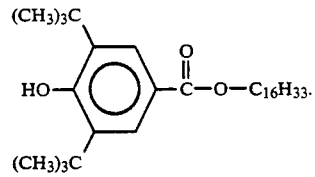

Among these, benzotriazole, anilide, hindered amine, and benzophenone ultraviolet absorbing agents are preferred.

As the antioxidant, for example, hindered phenol antioxidants such as

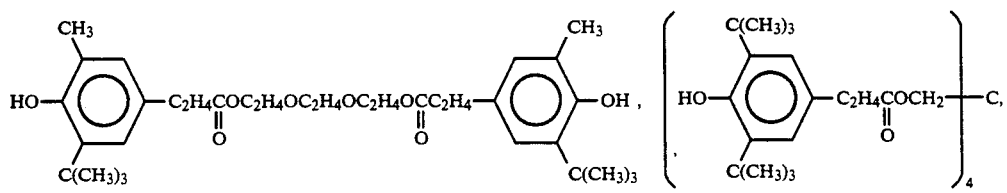

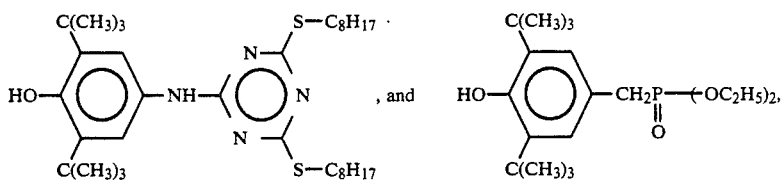

sulfur-containing antioxidants such as $S(CH_2CH_2COOC_{12}H_{15})_2$, and $(C_{12}H_{25}-S-CH_2CH_2\underset{\underset{O}{\|}}{C}OCH_2)_4C$, and phosphorus-containing antioxidants such as

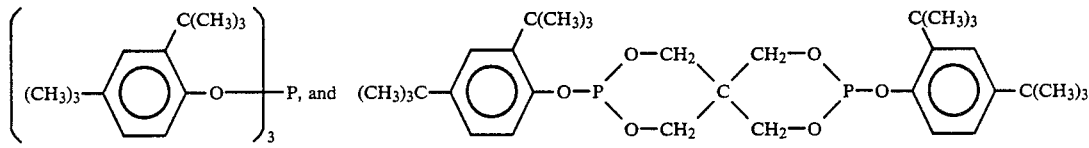

can be used, and in particular hindered phenol antioxidants can preferably be used.

The amount of the component (C) to be used is preferably 0.01 to 5.0 parts by weight, preferably 0.1 to 2.0 parts by weight, per 100 parts by weight of the component (A). If the amount of the component (C) to be used is too small, the effect possessed by the present composition for preventing deterioration due to ultraviolet light and oxidation is not exhibited fully. On the other hand, if the amount to be used is excessive, the adhesion, hardness, mechanical strength, and the like possessed by the product obtained by curing the present composition are destined to become low.

The ultraviolet absorbing agents and the antioxidants which constitute the component (C) may be used alone or as a mixture of two or more and the ultraviolet absorbing agent and the antioxidants may be used in combination. In the case where the ultraviolet absorbing agent and the antioxidant are used in combination, since an additive action in the effect for preventing deterioration is exhibited, it is well enough that the amount of the ultraviolet absorbing agent is about 0.05 to 0.5 part by weight and the amount of the antioxidant is about 0.05 to 0.5 part by weight.

Other Ingredients

In the present composition, a curing catalyst may be blended in order to shorten the time required for the curing. As the curing catalyst, any of curing catalysts conventionally used for condensation curing type organopolysiloxane compositions can be used. Specific examples include organotin compounds such as dibutyltin diacetate, dibutyltin octoate, dibutyltin dimethoxide, and tin dioctoate, titanium compounds such as tetraisopropoxy titanate, and guanidyl group-containing silanes such as tetramethylguanidylpropyltrimethoxysilane.

Generally, the amount of the curing catalyst to be blended is preferably 5.0 parts by weight or less, particularly preferably 0.1 to 1.0 part by weight, per 100 parts by weight of the component (A). If the blended amount is excessive, the time required for curing the composition is quite reduced to a few seconds, which not only lowers the workability but sometimes also brings about such inconvenience that the obtained cured product changes in shade.

In the present composition, any of additives conventionally used in this kind of composition can be blended unless the additive does not impair the purpose of the present invention for preventing the surface of the cured product and its surroundings from being soiled.

For example, if necessary, a reinforcing material such as fumed silica, precipitated silica, carbon powder, titanium dioxide, aluminum oxide, quartz powder, talk, sericite, and bentonite, a fibrous filler such as asbestos, a glass fiber, and an organic fiber, an oil resistance improver such as potassium methacrylate, a colorant, a heat resistance improver such as blood red and cerium oxide, a cold resistance improver, a thixotropic agent such as a polyether, a dehydrating agent, an adhesion improver such as γ-aminopropyltriethoxysilane, a flame retardancy improver such as a platinum compound, and a soiling preventive such as a surface active agent may be suitably blended.

The present room temperature curable silicone composition can be obtained by uniformly mixing the essential components (A) to (C) described above and optional components which will be added if desired. In this case, the obtained composition takes the form of a one-part room temperature curing composition. Also, the present composition can take the form of a two-part type room temperature curing composition by packaging the component (A) and the component (B) separately, which will be mixed when used.

The present composition when exposed to the air becomes cured due to a crosslinking reaction caused by the moisture present in the air to form a cured product. The obtained cured product is not only excellent in soil resistance and surface durability but also high in rubber strength and excellent in chemical resistance.

Uses

The present composition is useful as a sealing material and a coating material in building and engineering industry and also as an adhesive and a sealing medium for electrical and electronic parts.

EXAMPLES

In the following, the viscosity was measured at 25° C.

EXAMPLE 1

100 parts by weight of an organopolysilethylenesiloxane represented by the following general formula:

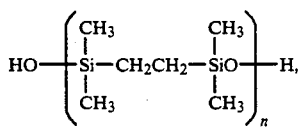

wherein n is a positive integer, and a viscosity of 2060 cSt, and 13 parts by weight of fumed silica were mixed to prepare a base compound. Then, 7 parts by weight of methyltributanoximesilane, 0.2 part by weight of dibutyltin dioctonate, 0.2 part by weight of an ultraviolet absorbing agent represented by the following formula:

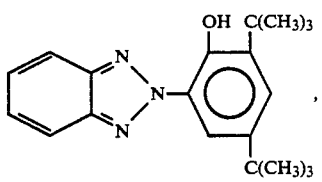

and an antioxidant represented by the following formula:

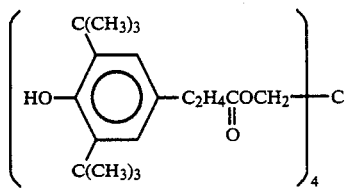

were mixed with this base compound to prepare a sealant which is a composition of the present invention.

COMPARATIVE EXAMPLE 1

Example 1 was repeated, except that the ultraviolet absorbing agent and the antioxidant were not used, thereby preparing a sealant.

The sealant of Example 1 and the sealant of Comparative Example 1 were cured by letting them stand for 7 days at 20° C. and 55% RH. After the completion of the curing, to check the durability of the cured products against ultraviolet light, ultraviolet light was applied onto each of the cured products by using an accelerated exposure weathering tester (tradename: Eyesuper UV tester weathering type SUV-F2, produced by Iwasaki Denki), and rubber physical properties of the cured products before the application of the ultraviolet light and after 200 hours and 400 hours of the application of the ultraviolet light were measured in accordance with JIS-K-6301, which gave the results shown in Table 1 below.

TABLE 1

|  |  | Example 1 | Comparative Example 1 |
|---|---|---|---|
| Before application of UV | $H_s$ | 40 | 40 |
|  | $E_1$ | 560 | 500 |
|  | $T_s$ | 120 | 123 |
| 200 hours after application of UV | $H_s$ | 38 | 21 |
|  | $E_1$ | 500 | 860 |
|  | $T_s$ | 110 | 55 |
| 400 hours after application of UV | $H_s$ | 37 | 13 |
|  | $E_1$ | 450 | 810 |
|  | $T_s$ | 102 | 20 |

Note:
$H_s$: hardness; $E_1$: elongation (%);
$T_s$: tensile stress (kg/cm$^2$)

Cured products obtained in the same way as above were left to stand outdoors, and after 3 months, 6 months, and 12 months, the level of soil occurred on the surface of each cured product and its surroundings was measured visually and evaluated according to the following criteria:
A: Occurrence of soil was not observed at all.
B: Occurrence of soil was observed slightly.
C: Occurrence of soil was observed considerably.
D: Occurrence of soil was observed seriously.
The obtained results are shown in Table 2.

TABLE 2

|  | Example 1 | Comparative Example |
|---|---|---|
| After 3 months | A | A |
| After 6 months | A | B |
| After 12 months | A | B |

EXAMPLES 2 TO 10 AND COMPARATIVE EXAMPLE 2

100 parts by weight of the base compound prepared in Example 1, 7 parts by weight of methyltributanoximesilane, 0.2 part by weight of dibutyltin dioctoate, and an ultraviolet absorbing agent shown in Table 3 below in a prescribed amount were mixed to prepare each sealant.

TABLE 3

|  | Ultraviolet absorbing agent | |
|---|---|---|
|  | Kind | Blended amount (part by weight) |
| Comparative Example 2 | not used |  |
| Example 2 | 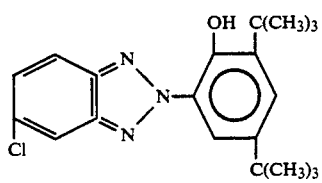 | 0.1 |
| Example 3 |  | 0.2 |
| Example 4 |  | 0.5 |

TABLE 3-continued

| | Ultraviolet absorbing agent | |
|---|---|---|
| | Kind | Blended amount (part by weight) |
| Example 5 | | 0.1 |
| Example 6 | (structure with -NH-C(=O)-C(=O)-NH- linking two phenyl rings bearing OC$_2$H$_5$ and H$_5$C$_2$O) | 0.2 |
| Example 7 | | 0.5 |
| Example 8 | | 0.1 |
| Example 9 | (polymeric structure with tetramethylpiperidinyl group: H-[O-C(CH$_3$)$_2$-CH$_2$-C(CH$_3$)$_2$-N-C$_2$H$_4$O-C(=O)-C$_2$H$_4$C(=O)-]$_n$-O-CH$_3$) | 0.2 |
| Example 10 | | 0.5 |

Each of the sealants of Examples 2 to 10 and Comparative Example 2 was cured in the same manner as in Example 1 and the ultraviolet light resistance of the obtained cured product was measured as follows. The cured product was irradiated with ultraviolet light by using the accelerated-exposure weathering tester used in Example 1, and after 200 hours and 400 hours of the application of ultraviolet light, the extent of the deterioration of the surface of the cured product was visually observed, and was evaluated according to the following criteria:

A: Any deterioration of the surface was not observed at all.
B: The surface was deteriorated and the smoothness was impaired slightly.
C: The surface was deteriorated and the smoothness was impaired conspicuously.

The results are shown in Table 4.

TABLE 4

| | Time of application of UV | |
|---|---|---|
| | After lapse of 200 hours | After lapse of 400 hours |
| Comparative Example 2 | B | C |
| Example 2 | A | A |
| Example 3 | A | A |
| Example 4 | A | A |
| Example 5 | A | A |
| Example 6 | A | A |
| Example 7 | A | A |
| Example 8 | A | A |
| Example 9 | A | A |
| Example 10 | A | A |

The product obtained by curing each of the sealants of the above Examples and Comparative Example was subjected to the soil resistance test in the same manner as in Example 1, and the soil resistance was evaluated in the same manner as in Example 1. The results are shown in Table 5.

TABLE 5

| | Period during which the cured product was allowed to stand outdoors | | |
|---|---|---|---|
| | 3 months | 6 months | 12 months |
| Comparative Example 2 | A | C | D |
| Example 2 | A | A | C |
| Example 3 | A | A | A |
| Example 4 | A | A | A |
| Example 5 | A | A | C |
| Example 6 | A | A | A |
| Example 7 | A | A | A |
| Example 8 | A | A | C |
| Example 9 | A | A | A |
| Example 10 | A | A | A |

We claim:

1. A room temperature curable silicone composition, comprising
   (A) an organopolysilethylenesiloxane represented by the following general formula (1):

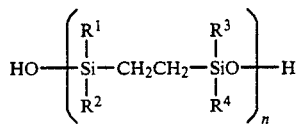

$$\text{HO}-\left(\begin{array}{c}R^1\\|\\Si-CH_2CH_2-\\|\\R^2\end{array}\begin{array}{c}R^3\\|\\SiO\\|\\R^4\end{array}\right)_n-H$$

wherein $R^1$, $R^2$, $R^3$, and $R^4$, which may be the same or different, each represent a substituted or unsubstituted monovalent hydrocarbon group having 1 to 10 carbon atoms, and n is an integer of 10 or more,
   (B) an organosilicon compound having two or more hydrolyzable groups in the molecule, and
   (C) one or more compounds selected from the group consisting of ultraviolet absorbing agents and antioxidants.

2. A composition as claimed in claim 1, wherein said component (B) is used in an amount of 1 to 25 parts by weight per 100 parts by weight of the component (A), and the component (C) is used in an amount of 0.01 to 5.0 parts by weight per 100 parts by weight of the component (A).

3. A composition as claimed in claim 1, wherein the organopolysilethylenesiloxane which is the component (A) has a viscosity in the range of 25 to 1,000,000 cSt at 25° C.

4. A composition as claimed in claim 3, wherein the organopolysilethylenesiloxane which is the component (A) comprises at least one polymer selected from the group consisting of the polymers of:

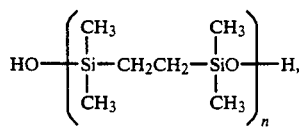

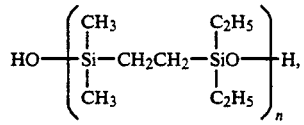

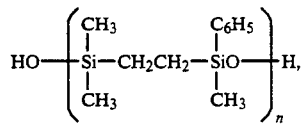

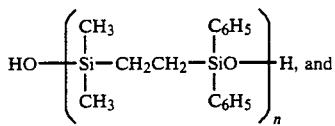

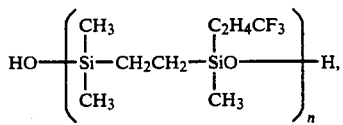

wherein in the formulas n is an integer of 10 to 5,000.

5. A composition as claimed in claim 1, wherein the organosilicon compound which is the component (B) is an organosilane or an organosiloxane having as the hydrolyzable group at least one group selected from the group consisting of an alkoxy group, an acyloxy group, an alkenyloxy group, and imioxy group, an amino group, an amido group, and an aminooxy group.

6. A cured product obtained by curing a composition as claimed in claim 1.

* * * * *